United States Patent [19]
Koch

[11] 3,710,220
[45] Jan. 9, 1973

[54] MOTOR SPEED REGULATION
[75] Inventor: A. Richard Koch, Beloit, Wis.
[73] Assignee: Barber-Colman Company, Rockford, Ill.
[22] Filed: July 15, 1971
[21] Appl. No.: 162,924

[52] U.S. Cl. ................................................. 318/328
[51] Int. Cl. ................................................. H02p 5/16
[58] Field of Search............... 318/326, 327, 328, 345

[56] References Cited

UNITED STATES PATENTS 3,609,494  9/1971  Takahashi ........................... 318/345
3,234,447  11/1966  Sauber ................................. 318/327
3,458,792  7/1969  Jabbar ................................. 318/328
3,514,686  5/1970  Shano ................................. 318/327

Primary Examiner—Bernard A. Gilheany
Assistant Examiner—Thomas Langer

[57] ABSTRACT

A variable direct voltage obtained from a motor-driven tachometer generator is connected in series with a voltage divider across a fixed direct reference voltage to provide a feedback voltage as a function of a preselected position on the voltage divider to regulate the speed of the motor driving the generator.

9 Claims, 5 Drawing Figures

MOTOR SPEED REGULATION

BACKGROUND OF THE INVENTION

This invention is concerned with automatic running speed control of an electric motor employing an electric generating tachometer type detector.

In many applications, such as tape drives and phonograph turntable drives, it is necessary to maintain drive motor speeds within very narrow limits to obtain satisfactory results. The market for such controls is very competitive so control systems for such use must be inexpensive to manufacture. The ultimate customer is usually without knowledge of the controls, but demands satisfactory operation even under adverse operating conditions. The control must therefore be simple and rugged, requiring little, and preferably no, maintenance throughout the lifetime expected of the apparatus by the customer.

Many controls of this general type are well known in the art. They compare a signal voltage obtained from a motor-driven generator with a reference voltage and use the result of the comparison to increase or decrease motor speed in order to maintain a predetermined speed. They differ in the manner in which the voltages are compared and in the manner in which the result is used to alter motor speed. The speed of a DC motor is determined from the formula:

$$S = (E_a - I_a R_m)/K\phi$$

where
- $S$ = speed
- $E_a$ = applied
- $I_a$ = armature current
- $R_m$ = armature winding resistance
- $\phi$ = flux per pole
- $K$ = constant depending on motor design Although in this invention the armature current $I_a$ is controlled, the voltage drop across the current controlling means is inversely proportional to the current, so that the applied emf $E_a$ varies as the difference between line voltage and the voltage drop. As $I_a$ increases, $E_a$ increases and the speed increases.

SUMMARY OF THE INVENTION

This invention provides a speed regulating system capable of maintaining motor speed substantially constant from no-load to substantially breakdown as a substantially linear function of the position of a setpoint adjustment and over substantially the entire range of available speed. The speed may also be regulated to rise or fall as a predetermined function of torque. The controls are simple, rugged, easily adjustable, inexpensive to produce, and require little, if any, maintenance. The control may be used to regulate speed of either AC or DC motors.

DESCRIPTION OF THE PREFERRED EMBODIMENTS

Figure 1:
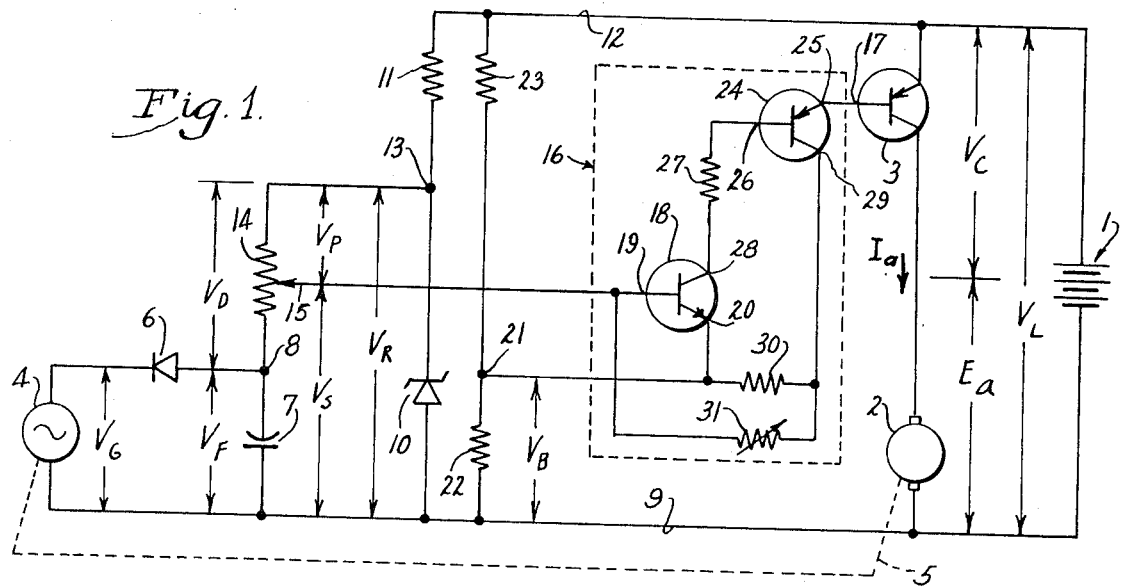
FIG. 1 is a schematic circuit diagram of a preferred embodiment of a motor speed regulating system according to this invention applied to regulate a DC motor.

In the preferred embodiment of FIG. 1, current from a DC source, shown for convenience as a battery 1, through an armature 2 of a DC motor is controlled by the control circuit of a current controlling means, such as the emitter-collector of a PNP transistor 3. An AC generator, such as a tachometer 4, driven in synchronism with the armature 2 as through mechanical coupling 5, produces a variable alternating generator voltage $V_G$ proportional in amplitude to motor speed. A rectifier 6 and a capacitor 7 are in a closed series circuit with the tachometer 4, providing across the capacitor between junction 8 and reference conductor 9 a direct feedback voltage $V_F$ variable in proportion to the motor speed. A fixed direct reference voltage $V_R$ is supplied by a voltage regulator, such as zener diode 10, connected in series with a voltage dropping resistor 11, between the positive conductor 12 and the negative reference conductor 9 connected to DC source 1. The reference voltage $V_R$ appears across the Zener 10 between conductor 9 and junction 13. A direct difference voltage $V_D$, which is the algebraic difference between, or arithmetic sum of, the reference voltage $V_R$ and the feedback voltage $V_F$, appears across a voltage divider, shown as a potentiometer 14, connected between junctions 13 and 8. The potentiometer provides between a selectable setpoint position at its tap or sliding contact 15 and junction 13 a direct proportional voltage $V_P$, which is a predetermined fraction K of the difference voltage $V_D$, and between its tap 15 and conductor 9 a direct signal voltage $V_S$, which is the algebraic difference between reference voltage $V_R$ and proportional voltage $V_P$.

The value of the signal voltage is given by the formula:

$$V_S = V_R - K(V_R - V_F) = (1-K)V_R + KV_F$$

Figure 2:
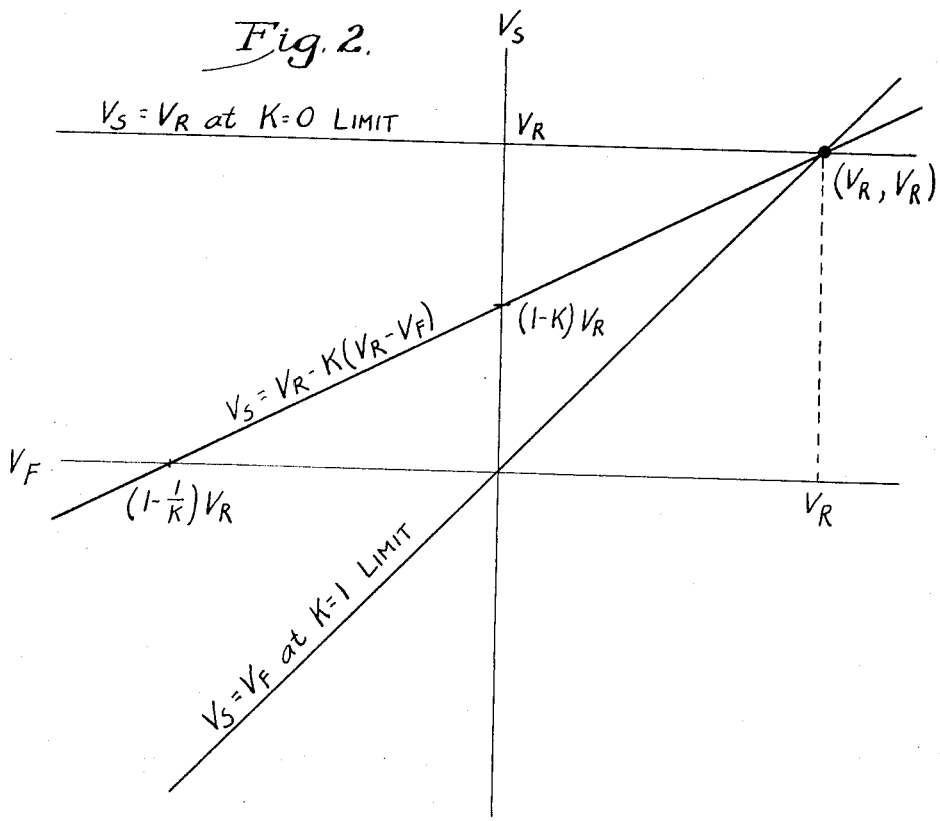
FIG. 2 is a graph showing the relationship between signal and feedback voltages $V_S$ and $V_F$ in the system shown in FIG. 1.

Since the reference voltage $V_R$ is constant, it will be seen that in plotting $V_S$ against $V_F$, as in FIG. 2, $V_S$ can be represented by a family of straight lines passing through the point $V_R$, $V_R$, with slopes limited between $K=0$ and $K=1$, with $V_S$ intercepts at $(1-K)V_R$ and $V_F$ intercepts at $[1-(1/K)]V_R$. At the limit $K=0$, the $V_S$ intercept is $V_R$ and the $V_F$ intercept is $-\kappa$. At the limit $K=1$, the $V_S$ intercept is 0 and the $V_F$ intercept is 0. It will be seen that $V_S$ varies linearly as a function of $V_F$, and therefore of the speed of motor 2, regardless of the value of $K$. As shown in FIG. 1, the value of $V_F$ is negative in polarity with respect to the reference conductor 9, so only that part of FIG. 2 to the left of the axis of the ordinates $V_S$ is applicable.

The signal voltage $V_S$ is delivered as an input to coupling means 16, the output of which is delivered to a control terminal of the current controlling means, shown as base 17 of transistor 3. The coupling means shown in FIG. 1 is an amplifier comprising an NPN transistor 18, the base 19 of which is connected to the tap 15 to receive the signal voltage $V_S$. The emitter 20 could be connected to reference conductor 9, but is shown as connected to junction 21 between resistors 22 and 23 in series between conductors 9 and 12 in order to compensate for fluctuation in line voltage $V_L$ between the conductors. The direct unregulated bias voltage $V_B$ across resistor 22 fluctuates in proportion to $V_L$ and so inversely modifies conductivity of transistor 18, which is controlled by the difference between the signal voltage $V_S$ applied to the base 19 and the bias voltage $V_B$ applied to the emitter 20. The transistor 18 acts as a differential input amplifier when $V_S$ exceeds $V_B$ by the characteristic base-emitter voltage required before conduction commences. A PNP transistor 24 has its emitter 25 connected to base 17 and its base 26 connected through resistor 27 to the collector 28 of transistor 18 so that conductivity of transistor 24 is proportional to conductivity of transistor 18 and conductivity of transistor 3 is proportional to conductivity of transistor 24. The collector 29 of transistor 24 is connected through resistor 30 to the junction 21, so that the bias voltage $V_B$ is also a function of the current $I_a$ through transistor 3 and motor armature 2, and through a feedback network, shown as a variable resistor 31, to base 19 of transistor 18.

Figure 3:
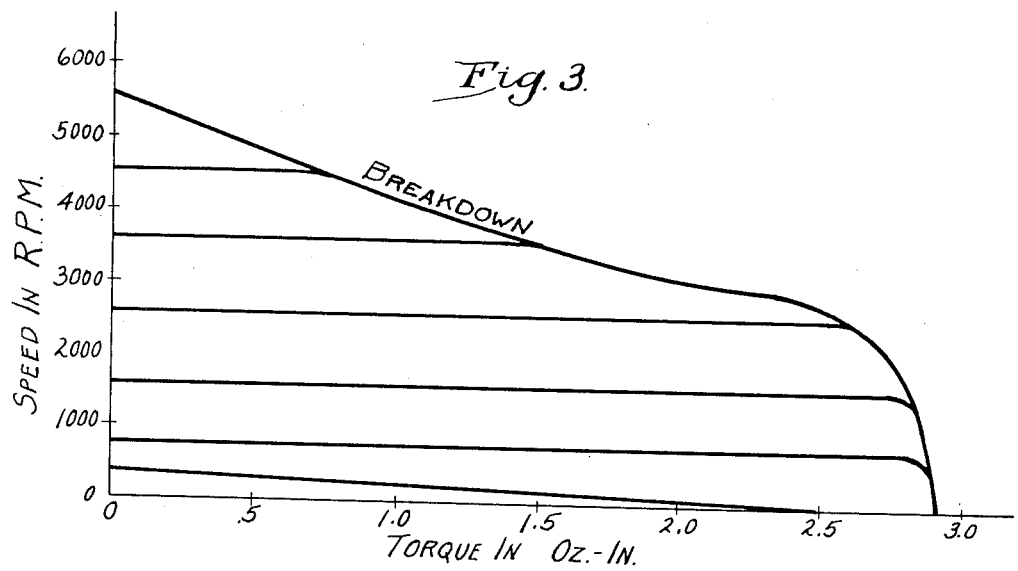
FIG. 3 is a graph showing the speed regulation obtainable with the system shown in FIG. 1.

FIG. 3 shows that speed regulation of a DC motor by the circuit shown in FIG. 1 may be held very closely from no load to substantially breakdown at all but low speeds, the setpoint speeds in each example being set by the sliding contact 15 on potentiometer 14.

Figure 4:
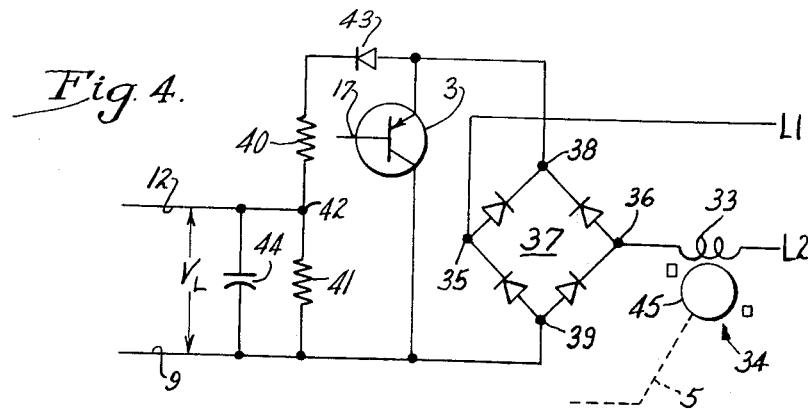
FIG. 4 is a partial schematic circuit diagram showing changes required in FIG. 1 to accomplish speed regulation of an AC motor.

FIG. 4 shows how the control circuit of FIG. 1 may be utilized to regulate the speed of an AC motor. As shown lines L1 and L2 deliver AC power from a source (not shown) through the primary winding 33 of a shaded pole motor 34 to the AC input terminals 35 and 36 of a rectifier bridge 37, the circuit being completed by conduction through transistor 3 between the positive terminal 38 and the negative terminal 39 of the bridge. Power for the control circuit is also obtained from the DC terminals 38 and 39. A voltage divider comprising a pair of resistors 40 and 41 are joined at junction 42 and connected through a blocking diode 43 between DC terminals 38 and 39. A capacitor 44 smoothes the voltage across resistor 41, providing the direct line voltage $V_L$ between junction 42 and terminal 39, which are connected to conductors 12 and 9 respectively. The conductors 9 and 12 and base 17 are electrically connected to the control elements, and the rotor 45 is mechanically connected to the mechanical coupling 5, as in FIG. 1.

Figure 5:
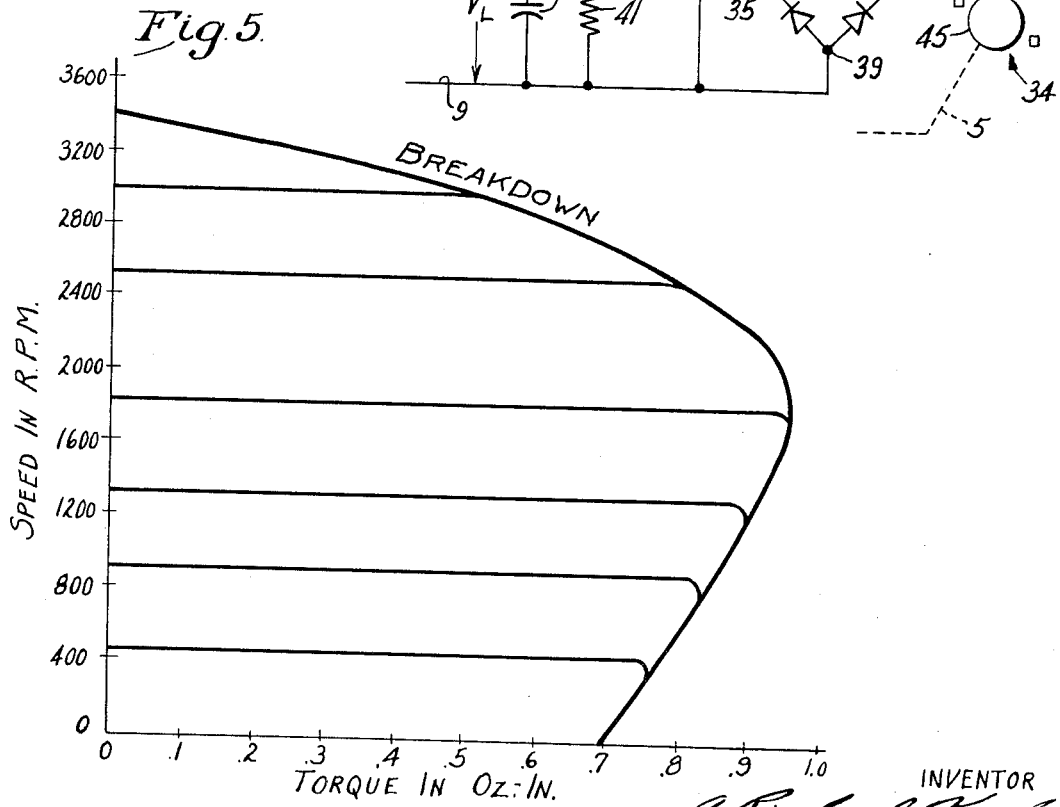
FIG. 5 is a graph showing the speed regulation obtainable with the system of FIG. 1 modified as in FIG. 4 to regulate speed of an AC motor.

With the circuit of FIG. 1 modified as shown in FIG. 4, a speed-torque relationship such as in FIG. 5 is obtained. The speed was only slightly reduced as the load increased and was very steady except at low speeds.

I claim:

1. A motor speed regulating system comprising a motor, a source of electric current energizing said motor, current amplitude modulating means in series with the motor to control said current, means coupled to the motor for producing a variable alternating voltage proportional in amplitude to the speed of said motor, a rectifier, a capacitor, said rectifier and said capacitor in series with the means for producing alternating voltage to provide across said capacitor a direct feedback voltage variable in proportion to said motor speed, a source of fixed direct reference voltage, a voltage divider, said voltage divider and said capacitor in series across said source of reference voltage with the sum of the feedback and the reference voltages across said voltage divider, a selectable setpoint position on the voltage divider, a control terminal on said current modulating means, and means fixedly coupling said setpoint position to the control terminal whereby the current is controlled in amplitude as a linear function of the voltage at said setpoint position.

2. A motor speed regulating system according to claim 1 wherein said source of alternating voltage comprises an alternating voltage tachometer generator mechanically coupled to the motor.

3. A motor speed regulating system according to claim 1 wherein said reference direct voltage source comprises a voltage regulator in a direct voltage supply circuit.

4. A motor speed regulating system according to claim 3 wherein said voltage regulator comprises a Zener diode.

5. A motor speed regulating system according to claim 1 wherein said means coupling the selectable position to said control terminal comprises an amplifier, an input of said amplifier coupled to the selectable position, and an output of said amplifier coupled to the control terminal.

6. A motor speed regulating system according to claim 5 additionally comprising a feedback network means for connecting a signal from said output to the input.

7. A motor speed regulating system according to claim 6 wherein said feedback network means comprised a selected resistance whereby said motor speed deviates from a predetermined no-load speed as a function of motor torque.

8. A motor speed regulating system according to claim 1 wherein said current control means comprises a transistor.

9. For use in a system to regulate the speed of a motor energized by an electric current in response to an alternating voltage input proportional in amplitude to the speed of said motor, a control circuit comprising means for controlling amplitude of the current through the motor, a rectifier and a capacitor in series receiving said input and producing across the capacitor a variable direct feedback voltage proportional to said motor speed, means for supplying a fixed direct reference voltage, a voltage divider and said capacitor in series across the means for supplying reference voltage with the sum of the feedback and the reference voltages across the voltage divider, a selectable setpoint position on the voltage divider, a control terminal on said means for controlling current, and means fixedly coupling said setpoint position to the control terminal whereby the amplitude of said current is controlled as a linear function of the voltage of said setpoint position.

* * * * *